United States Patent
Staschko et al.

(10) Patent No.: US 12,545,173 B2
(45) Date of Patent: Feb. 10, 2026

(54) PIPE SECURING SYSTEM FOR HEAVY-DUTY VEHICLES AND METHOD FOR SUPPORTING A PIPE ON A HEAVY-DUTY VEHICLE

(71) Applicant: EEW SPECIAL PIPE CONSTRUCTIONS GMBH, Rostock (DE)

(72) Inventors: Robert Staschko, Rostock (DE); Ulrich Sitz, Rostock (DE)

(73) Assignee: EEW SPECIAL PIPE CONSTRUCTIONS GMBH, Rostock (DE)

( * ) Notice: Subject to any disclaimer, the term of this patent is extended or adjusted under 35 U.S.C. 154(b) by 393 days.

(21) Appl. No.: 18/112,344

(22) Filed: Feb. 21, 2023

(65) Prior Publication Data
US 2023/0264623 A1    Aug. 24, 2023

(30) Foreign Application Priority Data

Feb. 22, 2022   (EP) ..................................... 22158095

(51) Int. Cl.
| | |
|---|---|
| *B60P 7/12* | (2006.01) |
| *B60P 3/40* | (2006.01) |
| *B60P 7/135* | (2006.01) |
| *F03D 13/40* | (2016.01) |

(52) U.S. Cl.
CPC ................... *B60P 7/12* (2013.01); *B60P 3/40* (2013.01); *B60P 7/135* (2013.01); *F03D 13/402* (2023.08)

(58) Field of Classification Search
CPC .... B60P 3/40; B60P 3/00; B60P 7/135; B60P 7/12; B61D 45/003; B61D 41/003; F03D 13/40; F03D 13/401; F03D 13/402
See application file for complete search history.

(56) References Cited

U.S. PATENT DOCUMENTS

| | | | | |
|---|---|---|---|---|
| 3,071,269 A | * | 1/1963 | Moulds, Jr. ............ | B65D 19/44 108/55.3 |
| 8,529,174 B1 | * | 9/2013 | Landrum .................. | B60P 3/40 410/44 |
| 2005/0286985 A1 | | 12/2005 | Anthony et al. | |

(Continued)

FOREIGN PATENT DOCUMENTS

| | | | | |
|---|---|---|---|---|
| CA | 2217997 A | * | 12/1997 | ................ B60P 3/40 |
| DE | 20 2011 003 305 | | 10/2011 | |

(Continued)

OTHER PUBLICATIONS

Extended European Search Report for EP App. 22158095.4 dated Aug. 3, 2022.

*Primary Examiner* — Daniel J Colilla
(74) *Attorney, Agent, or Firm* — GREENBLUM & BERNSTEIN, P.L.C.

(57) ABSTRACT

A pipe securing system for modular heavy-duty vehicles includes at least one support beam and at least one bearing device that is arranged on the support beam in the bearing state and next to the support beam in the resting state. A method for supporting a pipe on a modular heavy-duty is also provided. The pipe securing system and the method provide a space-saving system that dispenses with external lifting equipment, such as forklifts or cranes, and can be used both in a production hall and outside in the open.

13 Claims, 5 Drawing Sheets

(56) References Cited

U.S. PATENT DOCUMENTS

2011/0274511 A1\* 11/2011 Ferrari .................... B60P 3/035
                                                      410/49
2019/0285057 A1   9/2019 Jensen et al.
2022/0112882 A1   4/2022 Jensen et al.

FOREIGN PATENT DOCUMENTS

| DE | 10 2012 018 575 | 3/2014 |
| DE | 20 2014 000 615 | 8/2014 |
| EP | 3 342 637 | 7/2018 |
| WO | 2011/098086 | 8/2011 |

\* cited by examiner

PIPE SECURING SYSTEM FOR HEAVY-DUTY VEHICLES AND METHOD FOR SUPPORTING A PIPE ON A HEAVY-DUTY VEHICLE

The subject matter of the invention is a pipe securing system for heavy-duty vehicles and a method for supporting a pipe on a heavy-duty vehicle.

Large pipes, in particular made of longitudinal- and circumferential-seam-welded steel sheets, having a considerable diameter are used, for example, in foundation construction for offshore installations, in particular wind turbines. For large pipes that are used in the offshore sector, for example as monopiles or tripods, pipe diameters of greater than 6 m and now greater than 9 m are no longer a rarity. These large pipes have a high dead weight of several thousand tons and are, in comparison with the pipe diameter, embodied to be very thinly walled.

Figure 1:
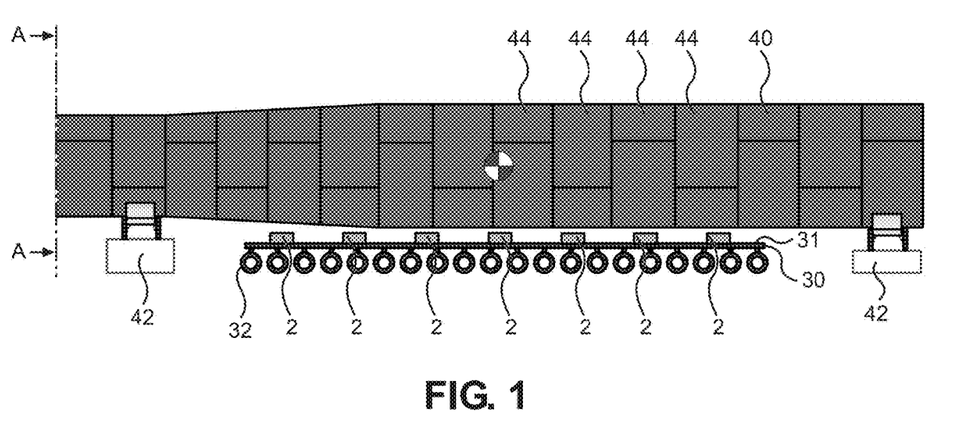
FIG. 1 shows a modular heavy-duty vehicle with a pipe in a side view.

The transport vehicles for large pipes of this type must therefore have an adequate load-bearing capacity in order to be able to carry the very large, long, and heavy pipes. The transport of the pipes on land typically occurs using modular heavy-duty vehicles, referred to as SPMT (self-propelled modular transporters). In the transport of large pipes, several of the modular heavy-duty vehicles are often positioned next to one another and connected to one another. A load distribution occurs, for example, by means of what are referred to as cross-beams, on which the pipe is placed. FIG. 1 shows a modular heavy-duty vehicle 30 with multiple cross-beams 2. A cross-beam 2 sits atop the modular heavy-duty vehicle 30 and thus reduces the clearance between the cross-beams 2 and pipe wall 41. The pipe, the wall thickness of which is additionally reduced in many cases, primarily in the region of support, that is, in the middle region of the pipe, requires supporting so that the pipe is not plastically deformed or warped due to its own weight. This leads to challenges in placing a necessary support structure under the pipe and on the cross-beams, in particular for transport out of the plant or when the pipe is placed on the bearing blocks.

Known is the use of centrally divided bearing shells that are laterally positioned under the pipe on the cross-beams using forklifts. A significant space requirement and a sufficient accessibility are thus necessary in order to transport these bearing blocks by means of forklifts. This space is often not available, especially in the plant area. In addition, the accessibility is also reduced because the space in the pipe shadow is limited in order to position the bearing blocks on the cross-beams using forklifts.

US 2005/0286985 A1 describes a system for supporting a cylindrical object such as a tank. The supports are embodied as lateral bearing blocks, wherein each support comprises a curved portion adjacent to the cylindrical object, and a base section. Because of the independence of the supports and the adjustability thereof in relation to the base, they are suitable for use with tanks of different sizes. However, there must be adequate space next to the cylindrical object in order to be able to position the supports under the object.

From EP 3 342 637 A1, a support system for transporting tower elements of a wind turbine is known. The support system comprises a retaining clamp with multiple arcuate slots spaced apart from one another. The slots are formed such that they correspond to a flange provided on the pipe elements. Plug plates are arranged in the slots, which plug plates are formed such that they correspond to the holes in the flange. The retaining clamps are secured to the pipe using bolts and nuts. A plurality of brackets can be used in order to enable the stacking of pipes during transport. The retaining clamps provide a high degree of safety, but are laborious to mount and are only suitable for pipes with flanges, and are not designed for a short-term use, for example during transport on plant grounds.

The object of the invention is to provide a pipe securing system for heavy-duty vehicles and a method for securing a pipe with the pipe securing system which overcomes the aforementioned disadvantages and is in particular suitable for pipes having large diameters of at least 6 m, can be deployed where there is low clearance and little space and for a short-term use such as a transport or a storage on plant grounds, and enables a safe and damage-free supporting of the pipe.

According to the invention, the object is attained with a pipe securing system for heavy-duty vehicles and a method for supporting a pipe on a heavy-duty vehicle.

Further embodiments are the subject matter of the dependent claims or are described below.

The pipe securing system for heavy-duty vehicles according to the invention comprises at least one support beam and at least one bearing device. The support beam is embodied to be at least partially plate-shaped or cuboid, and has a total width that is matched to the total width of a modular heavy-duty vehicle. The support beam has a load capacity of at least 500 t. The support beam is preferably composed of metal, particularly preferably of steel, and is equipped with a safety mechanism to prevent shifting. For transport, the support beam can be provided with attachment means, such as attachment eyes. The bearing device is arranged on the support beam in the operating state. The bearing device is a bearing shell. The bearing shell has a bottom side and a top side and two narrow transverse sides. The narrow transverse sides connect the bottom side and the top side, wherein the bottom side of the bearing shell forms a pedestal surface and the top side of the bearing shell comprises a channel-shaped recess in order to accommodate a pipe in the lying position. The channel-shaped recess extends at least partially between the two longitudinal sides of the bearing shell, and the longitudinal axis of the channel runs transversely to the longitudinal axis of the bearing shell. The bearing shell is at least partially composed of wood. On both transverse sides, the bearing shell comprises at least one lateral load handling means each that is arranged parallel to the longitudinal axis of the bearing shell and transversely to the longitudinal axis of a pipe that has been laid in position. In the resting state, the bearing shell is arranged next to the support beam. A load handling means is a component not belonging to the lifting device, which component enables the gripping of a load. The lateral load handling means are preferably embodied as metal profiles that are laterally attached to the bearing device.

The pipe is, for example, a tower element, such as a monopile, for a wind turbine and is embodied to be cylindrical or conical, or has cylindrical and conical sections. The pipe securing system is used to accommodate pipes and pipe sections with a diameter of at least 6 m, preferably a diameter of 8 to 10 m. The accommodation of pipes with larger diameters of 11.5 to 12 m, for example, is also conceivable.

The bearing shell comprises, on the top side thereof, a surface for accommodating a pipe, wherein this surface is embodied to be arcuate in order to accommodate a pipe in the lying position. The curvature of the top surface results in the formation of a channel, wherein the curvature is matched to the curvature of the pipe in the lying position. A channel corresponds to an open-seam pipe or cylinder segment, wherein the envelope surface, the curved portion of the top surface, extends to the bottom of the bearing shell, and the cross section runs on a plane with the top side of the bearing shell. The channel-shaped recess is preferably arranged in the middle of the bearing shell so that the distance from the deepest point of the channel to both transverse sides is equal. The region of the bearing shell with the channel-shaped recess is embodied to be continuous; that is, the top surface of the channel-shaped recess is formed from one piece.

The curved surfaces ensure a bracing of the pipe over a significant section of the width thereof. Through the use of multiple bearing shells along the length of the pipe, which bearing shells are arranged perpendicularly to a longitudinal central axis of the pipe, a uniform force distribution along the pipe width and along the pipe length are possible. The uniform force distribution minimizes the risk of mechanical damage or indentation during the loading, unloading, or transport.

The bearing shell preferably comprises a continuous top surface that is embodied from one piece, that is, is embodied in one piece or monolithically. Preferably, the bearing shell is composed of solid material, at least in the region beneath the channel-shaped recess. In a preferred embodiment, the bearing shell is composed of wood, preferably of glued laminated timber. The bearing shell can also be composed of plastic, for example polyurethane plastic, or hybrid materials of wood and PU plastic. The middle strip of the bearing shell is chosen such that the bearing shell exhibits sufficient stability when externally raised using the lifting device, yet does not require too much clearance under the pipe. In the region of the curved surface, the bearing shell has a diameter from which a reliable loading of the pipe results, which loading prevents permanent plastic warping during transport. For pipes with different diameters, different bearing shells are preferably used, the channel-shaped recesses of which have varying diameters.

The bearing device preferably has the same height as the support beam or is higher than the support beam, depending on the space below the pipe, that is, depending on the height of the clearance between the pipe wall and the top side of the support beam.

The pipe securing device is used on a modular heavy-duty vehicle, referred to as an SPMT (self-propelled modular transporter). These modular heavy-duty vehicles are modular vehicles with their own propulsion, that is self-propelled units, having multiple axles.

In one embodiment, the pipe securing system comprises a lifting device. The lifting device comprises a seat for the load handling means so that the lifting device can raise the load handling means or the load handling means can be connected to the lifting device. The seat can be a plate or an attachment means, for example. The lifting device is preferably electrical, mechanical, or hydraulic, particularly preferably an electric, mechanical, or hydraulic jack. The lifting device can be arranged next to the support beam on the transverse side of the bearing device and the transverse side of the support beam. If embodied as a jack, the lifting device preferably comprises rollers.

The pipe securing system has an empty state, in which it is not used and no pipe rests on the pipe securing system, and an operating state, in which a pipe rests on the pipe securing system and is secured by said system. The bearing shell is preferably arranged centrally on the support beam in the operating state and preferably has the same distance from both transverse sides of the support beam and the two longitudinal sides of the support beam. The bearing shell thereby rests over the entire area thereof on the support beam or stands on the support beam; that is, it is fully borne by the cross-beam, without lateral protrusions, to improve the stability and the application of force.

In one embodiment, the support beam comprises on the top side thereof position markers for the correct position of the bearing shell on the support beam.

Pipes made of steel, particularly structural steel, with large diameters of at least 6 m, in most cases even 8-10 m, have a considerable weight. Since the pipes have, in comparison with the large diameters and large masses, only a small wall thickness, they possess a low radial rigidity. The reduced wall thickness of the pipes requires supporting so that the pipe is not plastically deformed or warped due to its own weight. If supported improperly, dents or indentations are not impossible. Additionally, when supporting on a modular heavy-duty vehicle, the permissible axle load per vehicle must not be exceeded. Internal calculations have shown that, with the bearing shells, the highest possible number of bearing points are available so that the pipe on the one hand and also the permissible axle load of the vehicle on the other hand are not exceeded. In addition, the bearing shell results in an improved and more homogeneous load application to the structure of the heavy-duty vehicle.

The method according to the invention for supporting a pipe on a modular heavy-duty vehicle comprises the steps of:
a. providing at least one pipe securing system on a modular heavy-duty vehicle, wherein the pipe securing system comprises at least one support beam, at least one bearing shell per support beam, and at least two lifting devices per bearing shell,
b. positioning at least one bearing shell each laterally next to a support beam on the heavy-duty vehicle,
c. driving the heavy-duty vehicle under a pipe having a pipe diameter of at least 6 m,
d. raising the bearing shell by means of the lifting device,
e. moving the lifting devices and the bearing shell towards the support beam in the longitudinal direction of the pipe,
f. positioning the bearing shell over the support beam and lowering it onto the support beam,
g. repeating steps a. through g. for all bearing points, and
h. lowering the pipe onto the bearing shells or performing a lifting motion of the modular heavy-duty vehicle so that the pipe fully lies in the bearing shells and is uniformly supported.

A load handling means, preferably made of metal profiles, is applied to the bearing shells, preferably made primarily of glued laminated timber. The lifting device is positioned next to the bearing shell relative to the load handling means in an outer edge region of the heavy-duty vehicle. The bearing shells, which are positioned next to the support beams prior to transport, can be raised for use by means of the lifting device, and can be slid onto the cross-beams by a lateral displacement of the lifting device. The bearing shell is then lowered in the correct position, for example with the aid of position markers at the correct center position. Once these method steps have been completed for all bearing points, the pipe is lowered, or the heavy-duty vehicle completes a lifting motion, so that the pipe fully lies in the bearing shells and is uniformly supported.

The support beams sit atop the heavy-duty vehicle and thus reduce the clearance between the cross-beam and pipe wall. This leads to challenges in placing a necessary support structure under the pipe and on the cross-beams, in particular for transport out of the plant and when the pipe has been placed on the bearing blocks. The pipe securing according to the invention and the method according to the invention enable, despite reduced clearance under the pipe and the limited accessibility in the plant, a space-saving system that dispenses with external lifting equipment, such as forklifts or cranes, and can be used both in a production hall and outside in the open.

The height of a support beam is typically at least 300 mm, which results in a low clearance beneath the pipe. A bearing shell is respectively placed laterally next to a support beam on the load area of a heavy-duty vehicle before the heavy-duty vehicle drives under the pipe. The bearing shell, preferably having a comparable height to the support beam or higher, depending on the space between the support beam and pipe wall, is lifted by means of a lifting device, such as a jack for example, and moved transversally on rollers in the longitudinal direction of the pipe by means of the lifting device and positioned on the support beam. The rollers are preferably embodied such that a smooth-running and manual movement is enabled. It is thus possible to omit the use of heavy equipment, such as a forklift or crane.

The invention will be further explained with the aid of the figures. In the following.

FIG. 1 shows a pipe 40 for a wind turbine, which pipe is also referred to as a monopile, made of multiple pipe sections 44 that are welded together. The pipe 40 lies on two turning devices 42 which are respectively positioned in the region of the pipe ends. A modular heavy-duty vehicle 30 is positioned under the middle region of the pipe 40. Multiple support beams 2 are arranged on the load area 31. In accordance with the prior art, the pipe is placed and supported on the support beams after the lowering of the pipe or raising of the load area of the heavy-duty vehicle.

Figure 2:
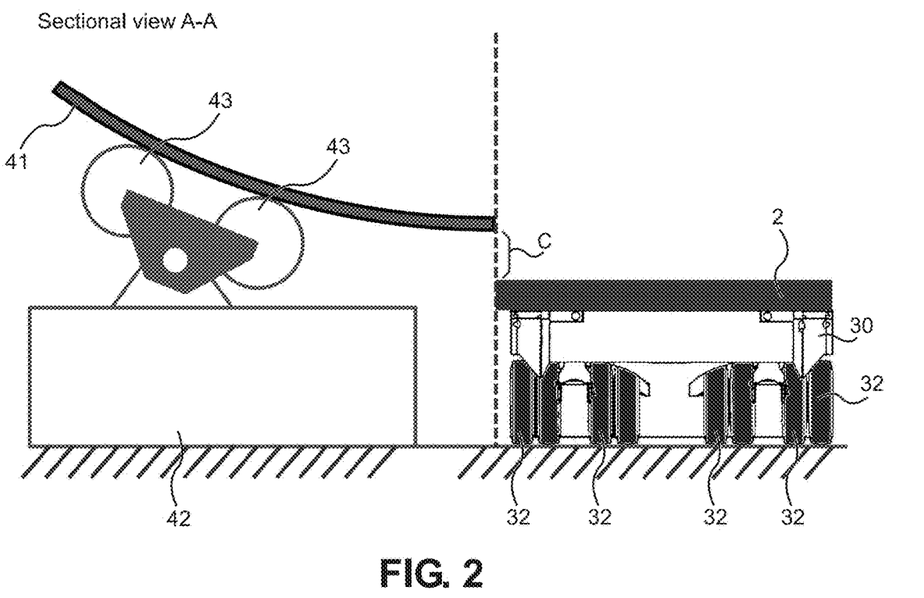
FIG. 2 shows a sectional view of FIG. 1.

FIG. 2 shows a sectional view of FIG. 1 along the section line A-A. The pipe wall 41 lies on two rollers 43 of the turning device 42. A support beam 2 is arranged on the load area of the modular heavy-duty vehicle 30. A clearance C can be seen between the pipe wall 41 and the top side of the support beam 2. The heavy-duty vehicle 30 is multi-axial and has a plurality of tires 32.

Figure 3:
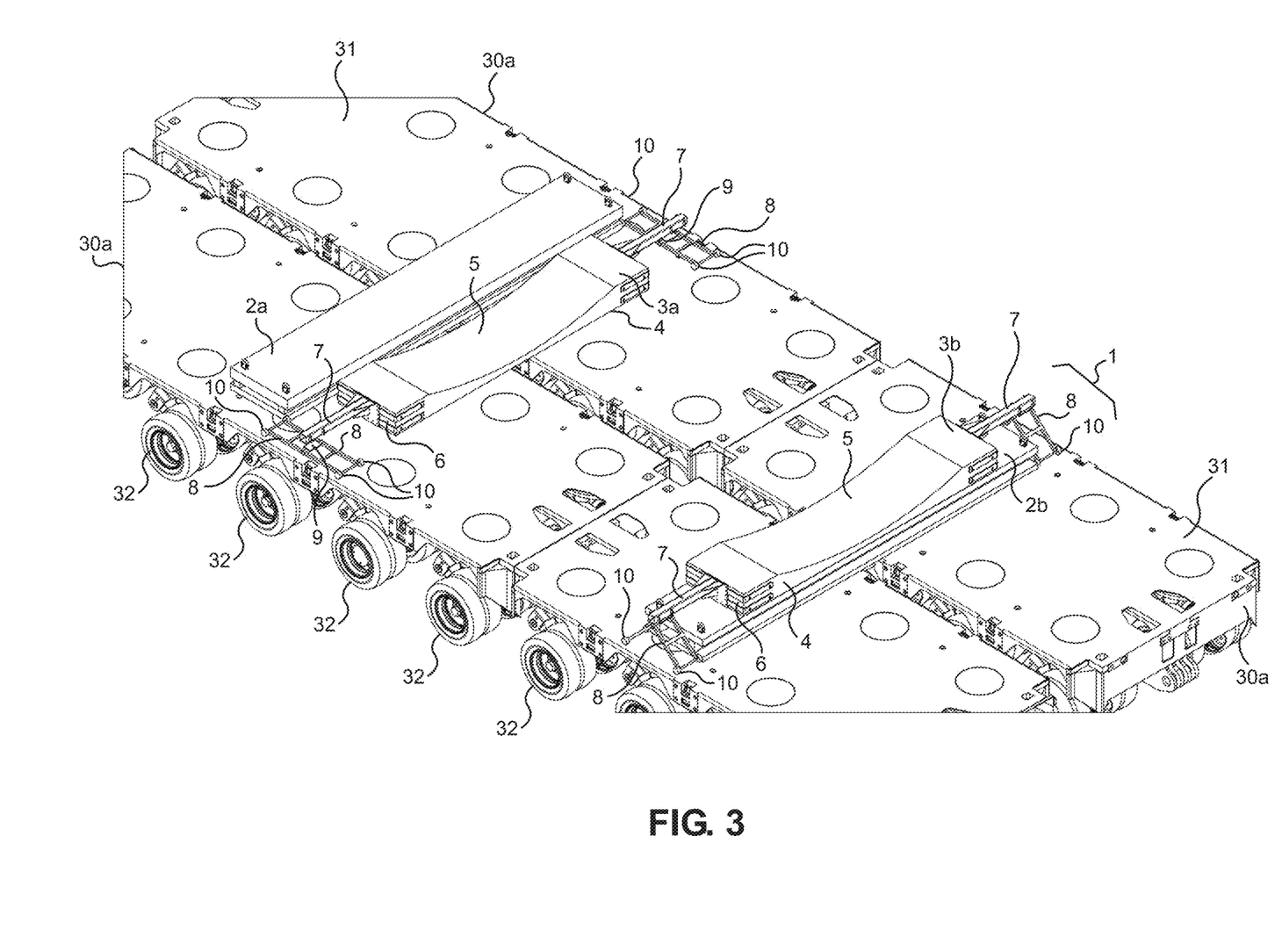
FIG. 3 shows a perspective view of two pipe securing systems on a load area of a heavy-duty vehicle.

FIG. 3 shows a detail from a load area 31 of a modular heavy-duty vehicle 30. The heavy-duty vehicle is assembled from multiple modules 30a. Two pipe securing systems 1 are positioned on the load area 31. The left-hand pipe securing system 1 is in the empty state, and the right-hand pipe securing system 1 is in the operating state. In the empty state, a bearing shell 3a is positioned next to a cross-beam 2a. The bearing shell 3a comprises on the bottom side thereof a pedestal surface 4 which stands on the load area 31. On the top side, the bearing shell comprises a recess 5, the curvature of which corresponds to the curvature of the pipe wall, in order to be able to accommodate the pipe. On both transverse sides 6 of the bearing shell, one load handling means 7 each is attached in the form of a metal profile. One lifting device 8 each is arranged beneath the load handling means 7. In the middle, the lifting device has a seat 9 for the load handling means 7 in the form of a plate. The lifting device 8, in this case a jack, comprises rollers 10 on its four corners. The right-hand pipe securing system is shown in the operating state. A bearing shell 3b is arranged on the support beam 2b. The pedestal surface 4 of the bearing shell 3b stands on the support beam 2b. The lateral load handling means 7 respectively lie on the two lifting devices 8 that have been rolled next to the support beam 2b.

Figure 4:
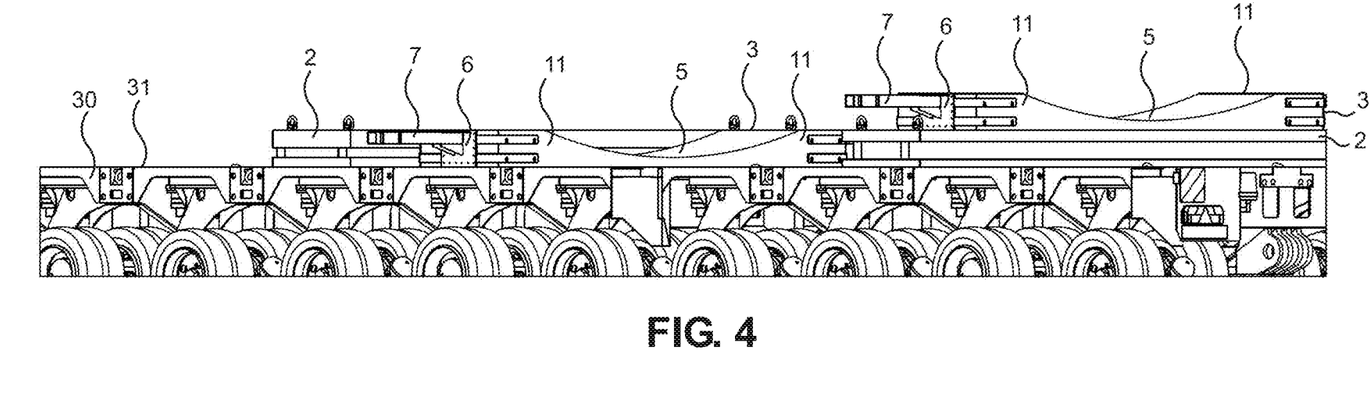
FIG. 4 shows a semi-oblique view of two pipe securing systems on a load area of a heavy-duty vehicle.

FIG. 4 likewise shows, in a semi-oblique view, two pipe securing systems on the load area 31 of a modular heavy-duty vehicle 30. The lifting devices have not been included in the illustration for either pipe securing system. The left-hand pipe securing system 1 is in the empty state, and the right-hand pipe securing system 1 is in the operating state. In the left-hand pipe securing system, a bearing shell 3 is positioned next to the cross-beam 2 in the empty state. The bearing shell 3 comprises a recess 5 on the top side. The higher side regions 11 of the bearing shell next to the recess have the same height as the support beam 2. On both transverse sides 6 of the bearing shell, one load handling means 7 each is attached in the form of a metal profile, the top side of which in this case likewise corresponds to the top side of the non-channeled side regions 11. The right-hand pipe securing system is shown in the operating state. The bearing shell stands on the support beam 2. The pedestal surface 4 of the bearing shell 3 stands on the support beam 2.

Figure 5:
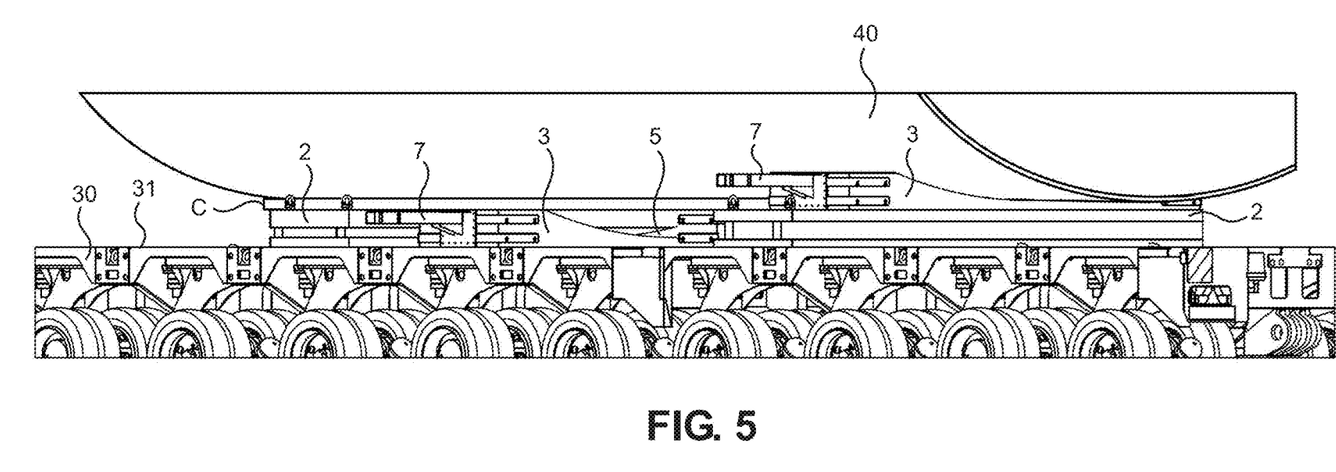
FIG. 5 shows a semi-oblique view of two pipe securing systems with a pipe laid in position.

FIG. 5 shows the two pipe securing systems from FIG. 4 in the same perspective, but with a pipe. The right-hand pipe securing system in the operating state carries the pipe, which lies in the recess 5 of the bearing shell 3. In the left-hand pipe securing system in the empty state, the clearance C between the pipe wall and the support beam 2 can be seen.

Figure 6A:
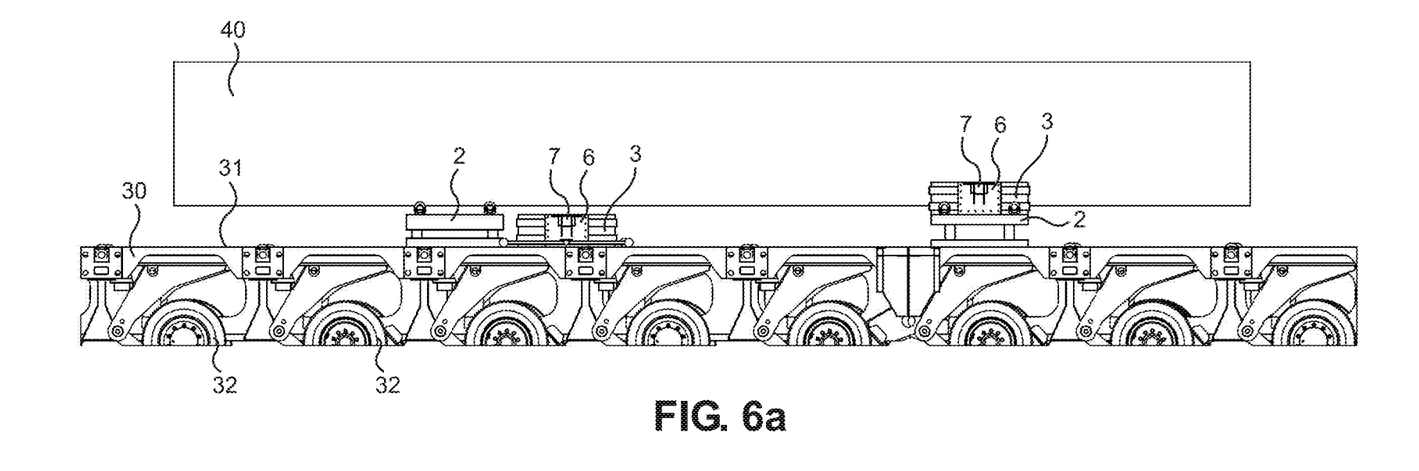
FIG. 6a and FIG. 6b show a lateral view of two pipe securing systems with and without a lifting device, with a pipe laid in position.
Figure 6B:
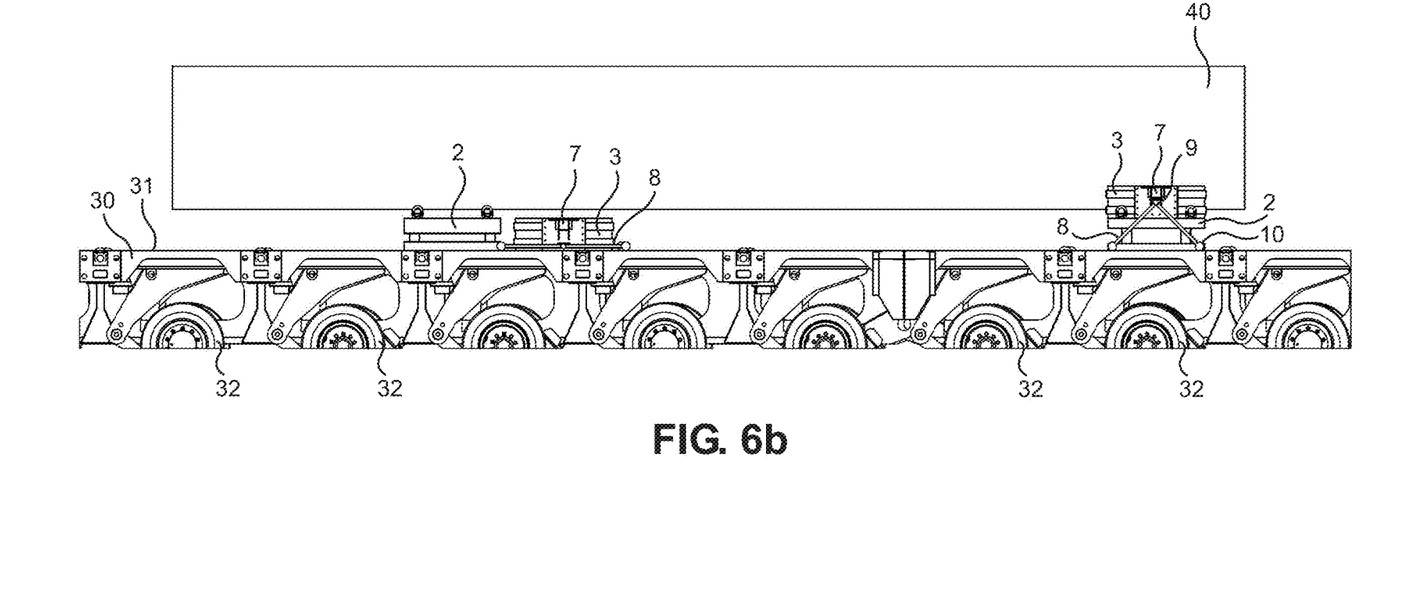

In FIGS. 6a and 6b, a side view of two pipe securing systems in the operating state and in the empty state are shown. In FIG. 6a, the pipe securing systems are illustrated without lifting devices. In the left-hand pipe securing system, the bearing shell 3 stands next to the support beam 2 on the load area 31. The bearing shell has the same height as the support beam. In the right-hand pipe securing system in the operating state, the bearing shell 3 is on the support beam 2 and the pipe 40 lies in the bearing shell. The pipe 40 is only shown here as a detail. In FIG. 6b, the pipe 40 is also only shown as a detail. In addition, the lifting devices 8 are shown in FIG. 6b. In the left-hand pipe securing system, the lifting device 8 is folded together next to the bearing shell 3. In the right-hand pipe securing system, the lifting device 8 is positioned next to the cross-beam 2, and the load handling means 7 of the bearing shell is still lying on the lifting device 8.

Figure 7:
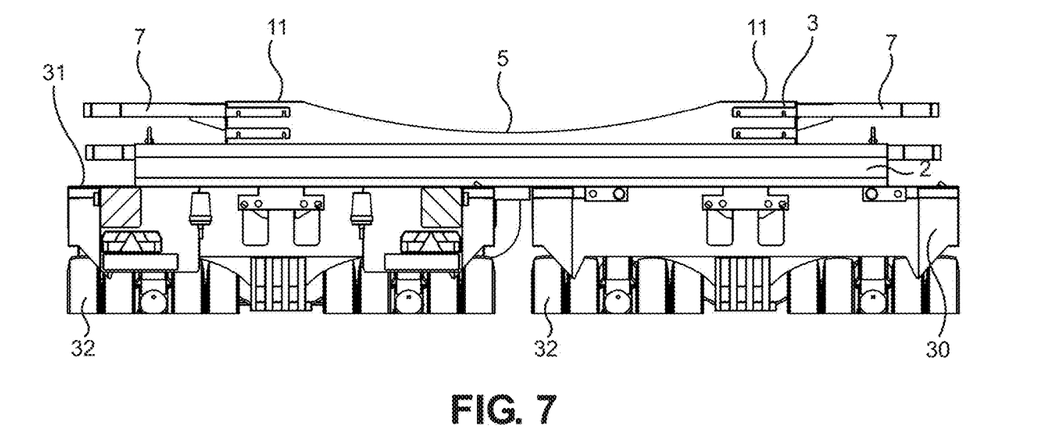
FIG. 7 shows a rear view of a heavy-duty vehicle with a pipe securing system.
Figure 8:
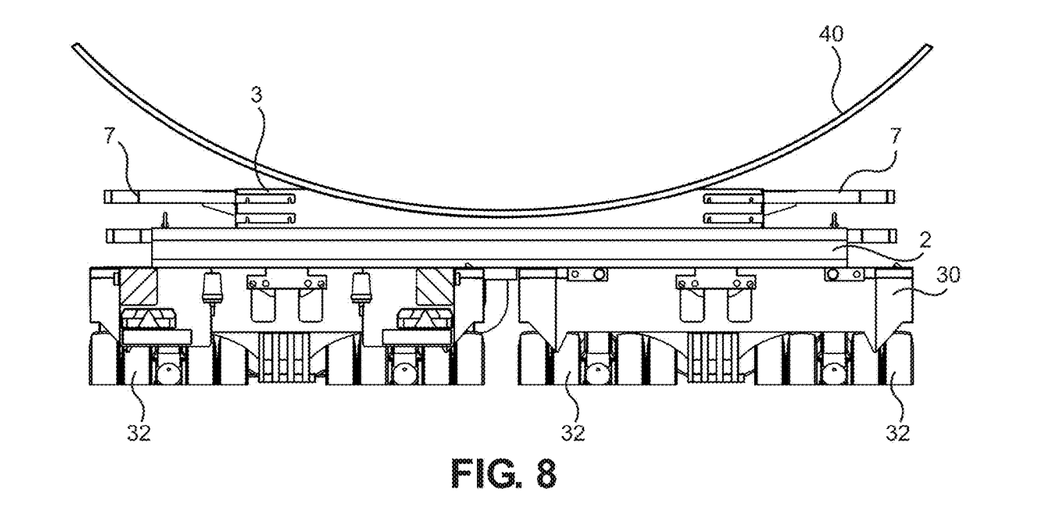
FIG. 8 shows a rear view of a heavy-duty vehicle with a pipe securing system and a pipe laid in position.

FIG. 7 shows a pipe securing system in a rear view, without a pipe laid in position. The bearing shell 3 stands on the support beam 2, which in turn stands on the load area 31 of the heavy-duty vehicle. In the center region, the bearing shell 3 comprises a recess 5, whereas the two side regions 11 are elevated. The load handling means 7 are affixed on the transverse sides. FIG. 8 shows the same view as FIG. 7, with a pipe 40 that lies in the bearing shell 3 being additionally shown as a detail. Due to the curvature of the bearing shell in the region of the recess, the pipe is both secured against a rolling-away and protected against mechanical damage.

Both from FIG. 5 and from FIGS. 6 and 7, it can be seen that the clearance between the support beam and pipe is only very low, and that it is therefore difficult to place a securing mechanism for the pipe under the pipe or in the pipe shadow. This problem is solved with the bearing shell, which can be moved in the tight space and is slid onto the support beam under the pipe by means of the lifting device.

The invention is not limited to any one of the embodiments described above, but rather can be modified in many and varied ways.

All features and advantages arising from the claims, the specification, and the drawings, including constructive details, spatial arrangements, and method steps, can be essential to the invention both separately and also in the most widely different combinations.

LIST OF REFERENCE SYMBOLS

1 Pipe securing system
2 Support beam
3 Bearing device
4 Pedestal surface
Recess
6 Transverse side
7 Lateral load handling means
8 Lifting device
9 Seat for the load handling means
Roller
11 Bearing shell side region
Modular heavy-duty vehicle
31 Load area
32 Tire
Pipe
41 Pipe wall
42 Turning device
43 Turning device roller
44 Pipe sections
C Clearance

The invention claimed is:

1. A pipe securing system for heavy-duty vehicles, comprising
at least one support beam, the at least one support beam being at least partially plate-shaped or cuboid,
at least one bearing device that is arranged on the at least one support beam in a bearing state, the at least one support beam having a load capacity of at least 500 t, wherein
the at least one bearing device is a bearing shell,
the bearing shell has a bottom side and a top side and two narrow transverse sides which connect the bottom side and the top side, wherein the bottom side of the bearing shell forms a pedestal surface and the top side of the bearing shell comprises a channel-shaped recess in order to accommodate a pipe in a lying position,
the bearing shell is at least partially composed of wood, and
the at least one bearing device comprises on both transverse sides at least one lateral load handling grip each arranged parallel to a longitudinal axis of the bearing shell and transversely to a longitudinal axis of a pipe that has been laid in position.

2. The pipe securing system according to claim 1, wherein the pipe securing system comprises a lifting device and the lifting device comprises a seat for the load handling grip so that the lifting device can raise the load handling grip or the load handling grip can be connected to the lifting device.

3. The pipe securing system according to claim 2, wherein the lifting device is at least one of an electrical, a mechanical, or a hydraulic jack.

4. The pipe securing system according to claim 2, wherein the lifting device is arranged next to the bearing shell on the transverse side of the bearing shell and comprises rollers.

5. The pipe securing system according to claim 1, wherein the bearing shell comprises a continuous top surface and is composed of solid material at least in the region beneath the channel-shaped recess.

6. The pipe securing system according to claim 5, wherein the bearing shell is composed of wood.

7. The pipe securing system of claim 6, wherein the wood is glued laminated timber.

8. The pipe securing system according to claim 1, wherein the at least one bearing device has the same height as the at least one support beam or is higher.

9. The pipe securing system according to claim 1, wherein each of the at least one of the lateral load handling grips are embodied as a metal profile laterally attached to the at least one bearing device.

10. The pipe securing system according to claim 1, wherein the bearing shell is arranged centrally on the at least one support beam in an operating state and is the same distance from both transverse sides of the at least one support beam and the two longitudinal sides of the at least one support beam and rests or stands with its entire area on the at least one support beam.

11. The pipe securing system according to claim 1, wherein the at least one support beam comprises on the top side thereof position markers for positioning of the bearing shell on the at least one support beam.

12. A method for supporting a pipe on a modular heavy-duty vehicle, comprising:
a. providing at least one pipe securing system according to claim 1 on the modular heavy-duty vehicle, wherein the pipe securing system further comprises at least one bearing shell per support beam, and at least two lifting devices per bearing shell;
b. positioning the at least one bearing shell next to the at least one support beam on the heavy-duty vehicle;
c. driving the heavy-duty vehicle under the pipe;
d. raising the at least one bearing shell by at least one of the at least two lifting devices;
e. moving the at least one of the at least two lifting devices and the at least one bearing shell towards the at least one support beam along the longitudinal axis of the pipe;
f. positioning the at least one bearing shell over the at least one support beam and lowering it onto the at least one support beam;
g. repeating a through f for each one of the at least one bearing devices; and
h. lowering the pipe onto each one of the at least one bearing shells or performing a lifting motion of the modular heavy-duty vehicle so that the pipe fully lies in each one of the at least one bearing shells and is uniformly supported.

13. The method of claim 12, wherein the at least one pipe securing system is provided beneath the pipe and the pipe has a diameter of at least 6 m.

* * * * *